US012609866B2

(12) United States Patent
Suresh

(10) Patent No.: US 12,609,866 B2
(45) Date of Patent: Apr. 21, 2026

(54) DETECTION OF LAG MISCONFIGURATION

(71) Applicant: HEWLETT PACKARD ENTERPRISE DEVELOPMENT LP, Spring, TX (US)

(72) Inventor: Kumar Suresh, Austin, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 62 days.

(21) Appl. No.: 18/612,204

(22) Filed: Mar. 21, 2024

(65) Prior Publication Data

US 2025/0300891 A1    Sep. 25, 2025

(51) Int. Cl.
*H04L 41/0893*        (2022.01)
*H04L 41/0873*        (2022.01)
*H04L 45/24*          (2022.01)

(52) U.S. Cl.
CPC ...... *H04L 41/0893* (2013.01); *H04L 41/0873* (2013.01); *H04L 45/245* (2013.01)

(58) Field of Classification Search
CPC ...................... H04L 41/0893; H04L 41/0873; H04L 45/245
See application file for complete search history.

(56) References Cited

U.S. PATENT DOCUMENTS

2012/0266013 A1* 10/2012 Shannon ................. H04L 41/08
                                                714/E11.073
2014/0112191 A1*  4/2014 Farkas ................ H04L 41/0853
                                                370/254
2015/0271015 A1*  9/2015 Velayudhan .......... H04L 45/245
                                                370/254
2022/0116313 A1   4/2022 Hu

* cited by examiner

*Primary Examiner* — Joseph R Maniwang
(74) *Attorney, Agent, or Firm* — Dickinson Wright

(57)            ABSTRACT

Systems and methods are provided for detecting link aggregation group (LAG) misconfigurations. Conventional operation of LACP is modified so that a network entity, such as a fabric manager may broadcast LAG configuration information to switches or devices of a fabric or network along with partner LAG configuration information. In this way, practical implementational challenges associated with the use of LACP instances in individual switches or devices and with the use of a fabric manager, can be avoided, where a switch or device in receipt of such partner LAG configuration information can compare that information with the switch's/device's current LAG configuration. Switches or devices need not exchange LACP messages directly, but can still be aware of fabric-wide LAG configurations that may impact their operation.

20 Claims, 9 Drawing Sheets a-port = 100-2; a-aggr = 10
p-port = 110-4; p-aggr = 20
a-system = SYS-A
p-system = SYS-B a-port = 110-4; a-aggr = 20
p-port = 100-2; p-aggr = 10
a-system = SYS-B
p-system = SYS-A a-port = 100-1; a-aggr = 10
p-port = 110-3; p-aggr = 20
a-system = SYS-A
p-system = SYS-B a-port = 110-3; a-aggr = 20
p-port = 100-1; p-aggr = 10
a-system = SYS-B
p-system = SYS-A

SWITCH 100 (SYS-A)

100-2

100-1

103

101

LAG 102

110-2

110-1

SWITCH 110 (SYS-B)

SWITCH 100 (actor)

100-2

100-1

103

101

110-2

110-1

SWITCH 110 (peer)

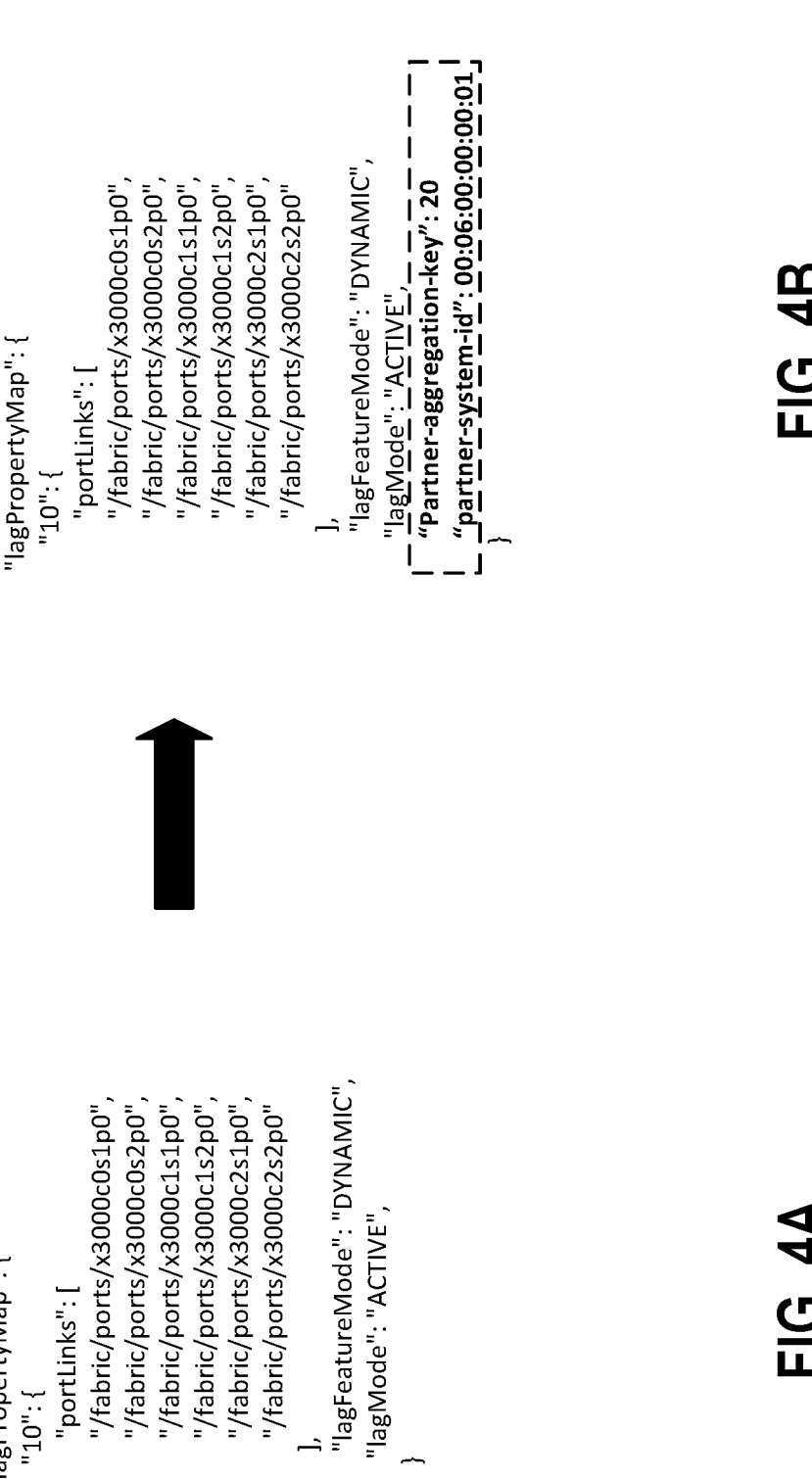

"lagPropertyMap": {
  "10": {
    "portLinks": [
      "/fabric/ports/x3000c0s1p0",
      "/fabric/ports/x3000c0s2p0",
      "/fabric/ports/x3000c1s1p0",
      "/fabric/ports/x3000c1s2p0",
      "/fabric/ports/x3000c2s1p0",
      "/fabric/ports/x3000c2s2p0"
    ],
    "lagFeatureMode": "DYNAMIC",
    "lagMode": "ACTIVE",
}

FIG. 4A

"lagPropertyMap": {
  "10": {
    "portLinks": [
      "/fabric/ports/x3000c0s1p0",
      "/fabric/ports/x3000c0s2p0",
      "/fabric/ports/x3000c1s1p0",
      "/fabric/ports/x3000c1s2p0",
      "/fabric/ports/x3000c2s1p0",
      "/fabric/ports/x3000c2s2p0"
    ],
    "lagFeatureMode": "DYNAMIC",
    "lagMode": "ACTIVE",
    "Partner-aggregation-key": 20
    "partner-system-id": 00:06:00:00:00:01
}

FIG. 4B

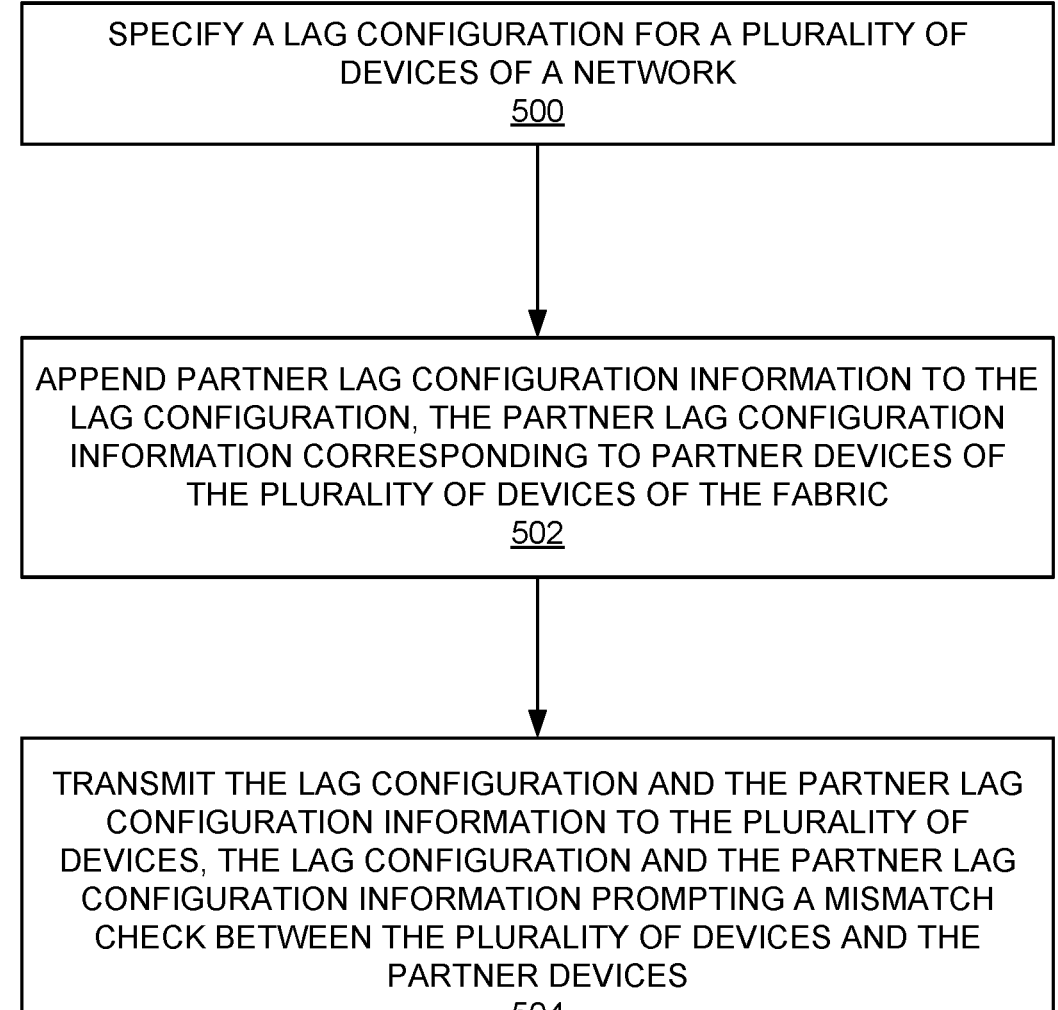

SPECIFY A LAG CONFIGURATION FOR A PLURALITY OF
DEVICES OF A NETWORK
500

APPEND PARTNER LAG CONFIGURATION INFORMATION TO THE
LAG CONFIGURATION, THE PARTNER LAG CONFIGURATION
INFORMATION CORRESPONDING TO PARTNER DEVICES OF
THE PLURALITY OF DEVICES OF THE FABRIC
502

TRANSMIT THE LAG CONFIGURATION AND THE PARTNER LAG
CONFIGURATION INFORMATION TO THE PLURALITY OF
DEVICES, THE LAG CONFIGURATION AND THE PARTNER LAG
CONFIGURATION INFORMATION PROMPTING A MISMATCH
CHECK BETWEEN THE PLURALITY OF DEVICES AND THE
PARTNER DEVICES
504

FIG. 5A

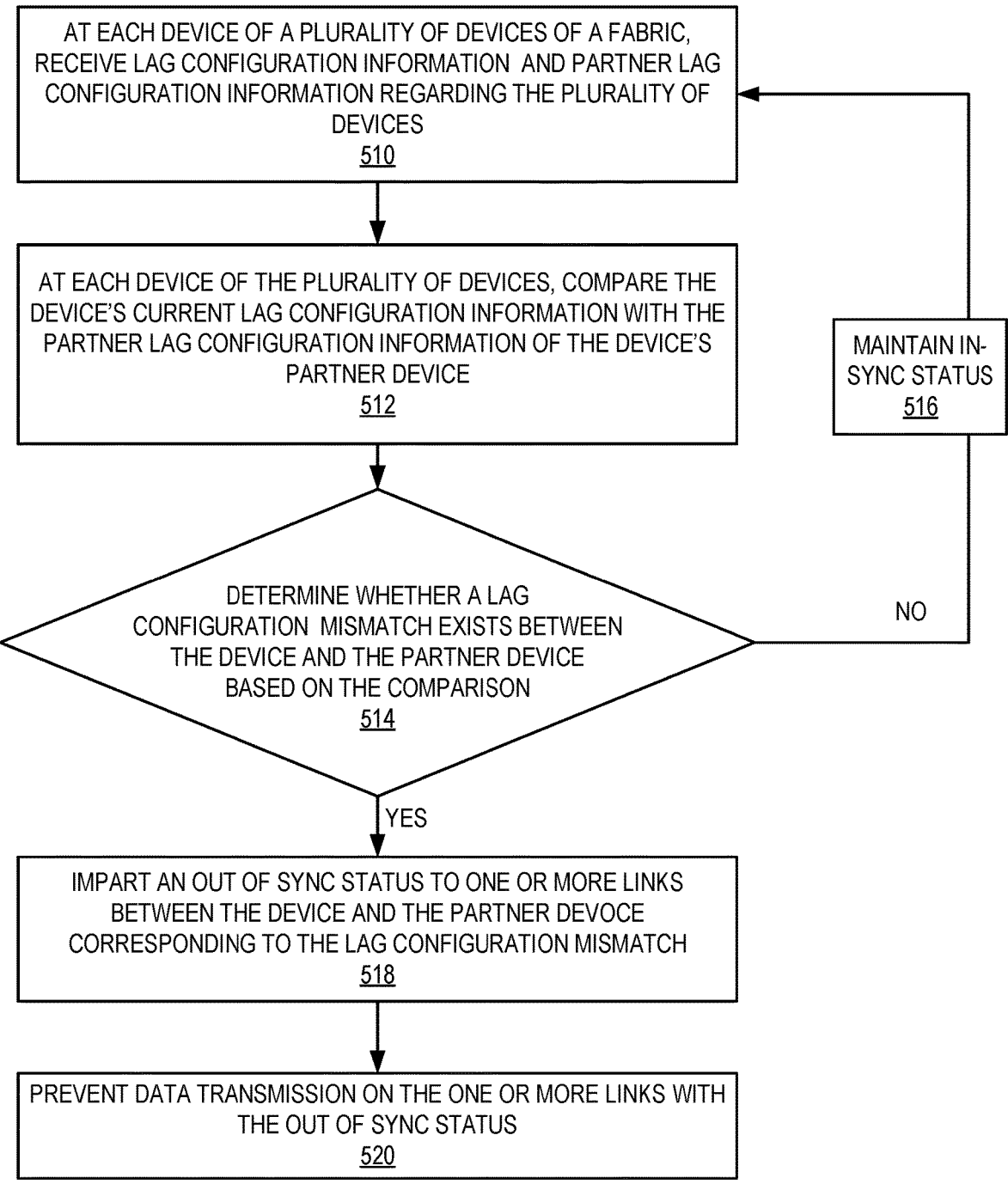

AT EACH DEVICE OF A PLURALITY OF DEVICES OF A FABRIC, RECEIVE LAG CONFIGURATION INFORMATION AND PARTNER LAG CONFIGURATION INFORMATION REGARDING THE PLURALITY OF DEVICES
510

AT EACH DEVICE OF THE PLURALITY OF DEVICES, COMPARE THE DEVICE'S CURRENT LAG CONFIGURATION INFORMATION WITH THE PARTNER LAG CONFIGURATION INFORMATION OF THE DEVICE'S PARTNER DEVICE
512

DETERMINE WHETHER A LAG CONFIGURATION MISMATCH EXISTS BETWEEN THE DEVICE AND THE PARTNER DEVICE BASED ON THE COMPARISON
514

MAINTAIN IN-SYNC STATUS
516

NO

YES

IMPART AN OUT OF SYNC STATUS TO ONE OR MORE LINKS BETWEEN THE DEVICE AND THE PARTNER DEVOCE CORRESPONDING TO THE LAG CONFIGURATION MISMATCH
518

PREVENT DATA TRANSMISSION ON THE ONE OR MORE LINKS WITH THE OUT OF SYNC STATUS
520

FIG. 5B

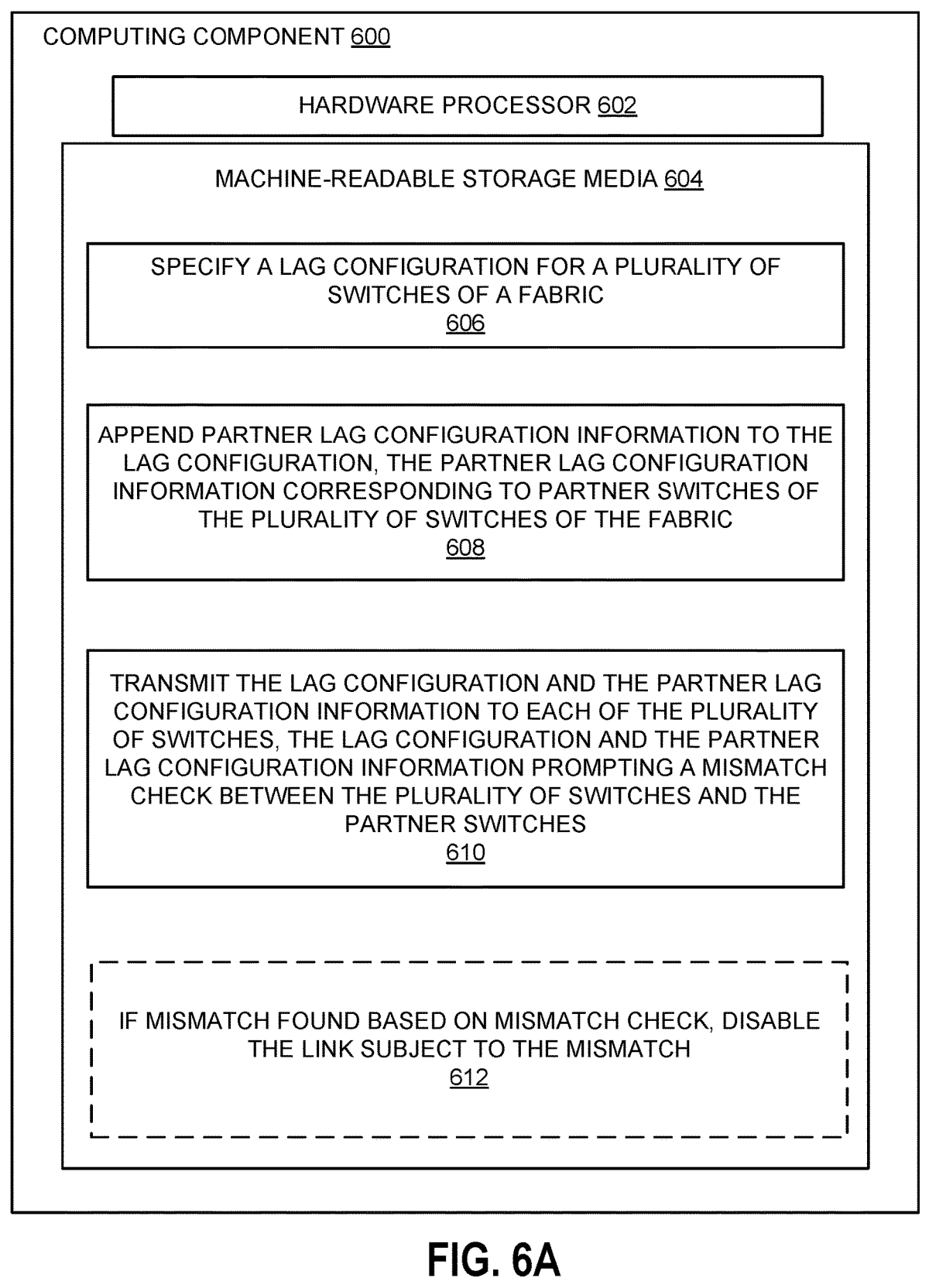

COMPUTING COMPONENT 600

HARDWARE PROCESSOR 602

MACHINE-READABLE STORAGE MEDIA 604

SPECIFY A LAG CONFIGURATION FOR A PLURALITY OF
SWITCHES OF A FABRIC
606

APPEND PARTNER LAG CONFIGURATION INFORMATION TO THE
LAG CONFIGURATION, THE PARTNER LAG CONFIGURATION
INFORMATION CORRESPONDING TO PARTNER SWITCHES OF
THE PLURALITY OF SWITCHES OF THE FABRIC
608

TRANSMIT THE LAG CONFIGURATION AND THE PARTNER LAG
CONFIGURATION INFORMATION TO EACH OF THE PLURALITY
OF SWITCHES, THE LAG CONFIGURATION AND THE PARTNER
LAG CONFIGURATION INFORMATION PROMPTING A MISMATCH
CHECK BETWEEN THE PLURALITY OF SWITCHES AND THE
PARTNER SWITCHES
610

IF MISMATCH FOUND BASED ON MISMATCH CHECK, DISABLE
THE LINK SUBJECT TO THE MISMATCH
612

FIG. 6A

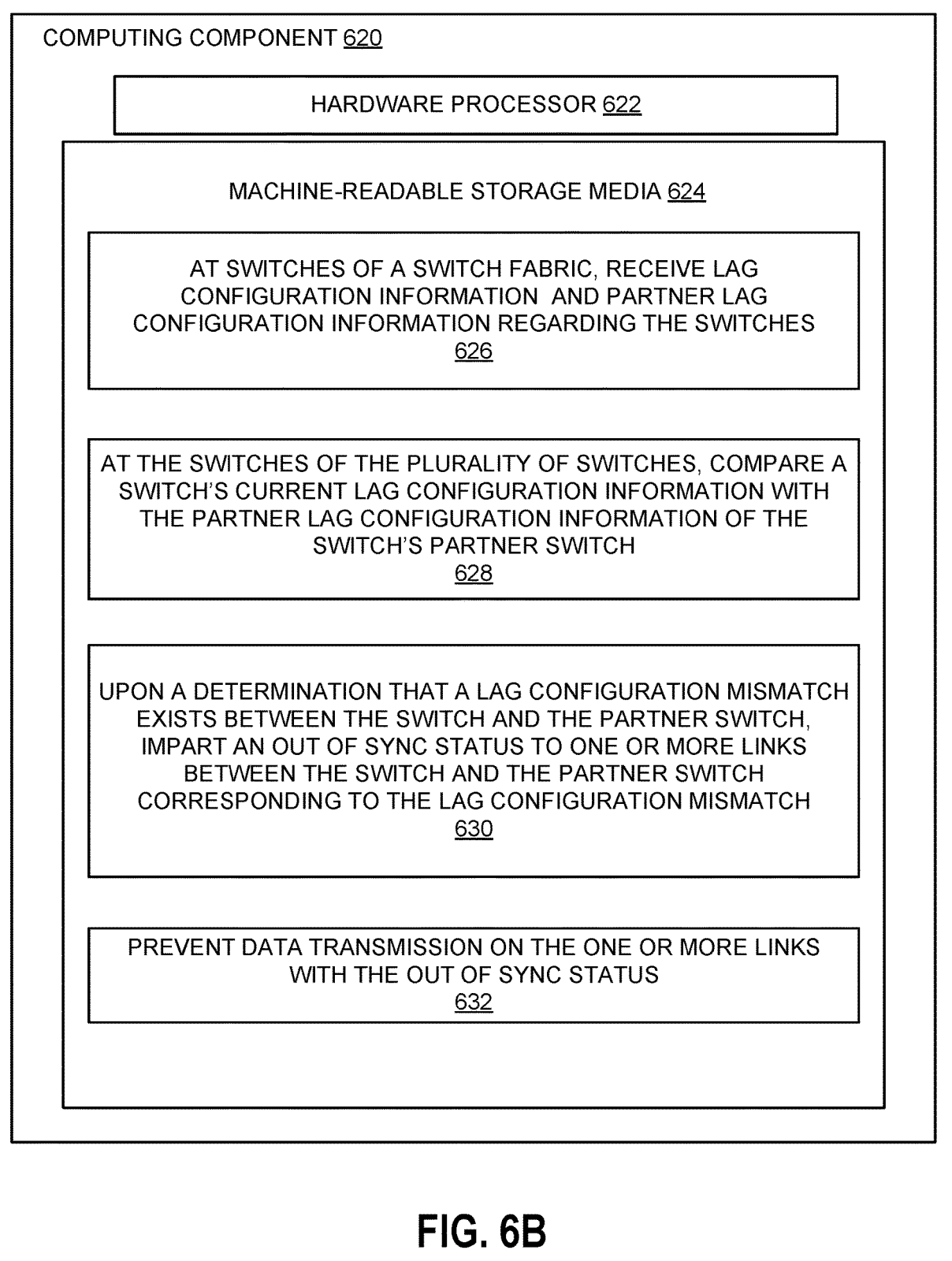

COMPUTING COMPONENT 620

HARDWARE PROCESSOR 622

MACHINE-READABLE STORAGE MEDIA 624

AT SWITCHES OF A SWITCH FABRIC, RECEIVE LAG
CONFIGURATION INFORMATION  AND PARTNER LAG
CONFIGURATION INFORMATION REGARDING THE SWITCHES
626

AT THE SWITCHES OF THE PLURALITY OF SWITCHES, COMPARE A
SWITCH'S CURRENT LAG CONFIGURATION INFORMATION WITH
THE PARTNER LAG CONFIGURATION INFORMATION OF THE
SWITCH'S PARTNER SWITCH
628

UPON A DETERMINATION THAT A LAG CONFIGURATION MISMATCH
EXISTS BETWEEN THE SWITCH AND THE PARTNER SWITCH,
IMPART AN OUT OF SYNC STATUS TO ONE OR MORE LINKS
BETWEEN THE SWITCH AND THE PARTNER SWITCH
CORRESPONDING TO THE LAG CONFIGURATION MISMATCH
630

PREVENT DATA TRANSMISSION ON THE ONE OR MORE LINKS
WITH THE OUT OF SYNC STATUS
632

FIG. 6B

DETECTION OF LAG MISCONFIGURATION

BACKGROUND

Layer 2 networks continue to increase in scale due to the prevalence of certain technologies, such as virtualization. Link aggregation (introduced in IEEE 802.3ad) attempts to address scalability issues associated with virtualization, e.g., the use of logical links relative to actual, physical connections. That is, protocols, such as the Spanning Tree Protocol, only provide one active path or link from one network device to another. This is true regardless of how many other actual connections may exist in the network.

Link aggregation can address some of the aforementioned issues by allowing traffic to traverse more than one link between, e.g., switches. That is, all physical connections may be considered to be one logical connection, where the connections are point-to-point.

BRIEF DESCRIPTION OF THE DRAWINGS

The present disclosure, in accordance with one or more various examples, is described in detail with reference to the following figures. The figures are provided for the purposes of illustration only and merely depict typical examples.

FIG. 4A is an example of a conventional LAG configuration.

FIG. 4B is an example of an updated LAG configuration in accordance with examples of the present disclosure.

FIG. 5A illustrates example operations that may be performed to effectuate LAG mismatch determination and traffic control FIG. 5B illustrates other example operations that may be performed to effectuate LAG mismatch determination and traffic control FIG. 6A is an example computing component that may be used to implement LAG misconfiguration detection in accordance with examples of the present disclosure.

FIG. 6B is an example computing component that may be used to implement LAG misconfiguration detection in accordance with other examples of the present disclosure.

Figures 1A, 1B:
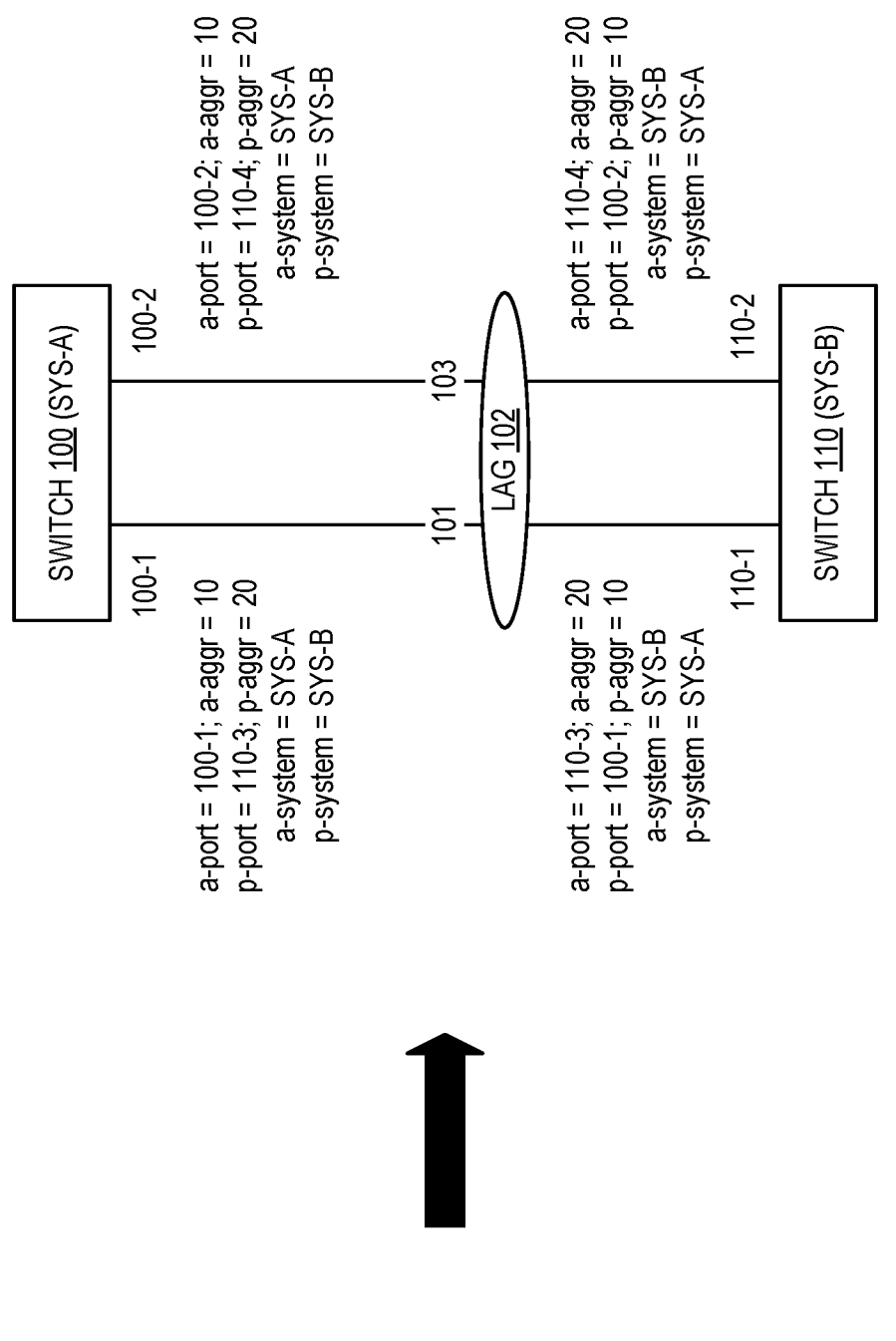
FIG. 1A is an example schematic representation of two switches connected by links, as in the case of a switch fabric.
FIG. 1B illustrates example LACP LAG configuration information and exchange between the switches of FIG. 1A.

The figures are not exhaustive and do not limit the present disclosure to the precise form disclosed.

DETAILED DESCRIPTION

Certain network topologies, such as a dragonfly topology, can be used in the context of fabric interconnects, where literally, thousands of switches can be connected to one another. Link aggregation refers to aggregating or bundling links between two devices (referred to as partners or peers), e.g., two switches, to create a single logical link. A group of bundled links can be referred to as a link aggregation group (LAG). The Link Aggregation Control Protocol (LACP) is a mechanism used to provide guidance to switches regarding link aggregation, where LACP instances typically (or are intended to be) run on each switch.

In particular, LACP is used to negotiate between partners regarding the aggregation of links vis-à-vis exchanging partner device information regarding its links. However, LACP instances do not generally share actor/partner information with other LACP instances of other actor switches, which can result in scenarios where a configuration mismatch occurs, e.g., where one actor switch has a configuration reflecting a particular switch port belonging to a link bundle, and the other actor switch has a conflicting configuration reflecting that the switch port belongs to a different link bundle or group. Some conventional solutions leverage the use of a centralized fabric manager in conjunction with the LACP mechanism, where the centralized fabric manager pushes down LAG configurations to switches. However, and again, because LACP instances do not interact with one another, misconfigurations may still occur. Moreover, sharing partner information from each LACP instance (recalling fabric interconnects may comprise thousands of switches) with a centralized fabric manager (to theoretically address misconfigurations) would result in latencies that would make it impossible to sync partner information from all switches in real-time.

Accordingly, examples of the disclosed technology modify the interactions between a centralized fabric manager and LACP instances so that the centralized fabric manager can push down, to each LACP instance running in each switch of the fabric, the typical LAG configuration, as well as partner information. In this way, even though the LACP instances running on each partner switch do not share partner information, the LACP instances of each switch can compare the configuration received from the centralized fabric manager to their own LACP instance-provided configuration. Contrary to conventional LAG schemes/implementations, switches (or devices) are provided with LAG configuration corresponding to their peer/partner switches (or devices). By being given the ability to compare local and received configurations, LAG configuration mismatches can be detected. If LAG configuration mismatches are detected, traffic routing through the switches/fabric can be modified or adjusted to account for the LAG configuration mismatches. That is, the links impacted by the LAG configuration mismatch can be disabled or access to such links can be disabled or prohibited. This avoids data being lost, or other unwanted behavior, such as the creation of a traffic loop in the fabric. Further still, when LAG mismatches arise, all links/LAGs may be assumed by the peer switches to be "valid" or operational, and data may continue to be transmitted thereon creating a decrease in overall traffic throughput. This too can be avoided by the determination of LAG mismatches and disabling those links/LAGs that are mismatched.

To avoid the need for communications between all switches (or other entities) and to avoid incurring delays, examples of the present disclosure are directed to effectuating particular interactions between a centralized fabric manager and each switch (or other network device) in a network that is running an instance of LACP to define LAGs while avoiding LAG configuration mismatches.

That is, currently, a fabric manager attends to switch configuration with software code that identifies a LAG, and a switch identifier along with corresponding jack/port identifiers. In addition to this switch configuration information, the fabric manager will also propagate LAG-related information. In some examples, such LAG-related information may comprise partner aggregation information, such as a partner aggregation key or ID, along with partner system ID information. This information is propagated to switches in the fabric. In this way, switches of the switch fabric can compare their own/local LAG-related information or configuration with that of a partner or peer switch to determine if a LAG mismatch(es) exist.

FIG. 1A is a schematic representation of two switches connected by links, as in the case of a switch fabric. As illustrated in FIG. 1A, a switch 100 may be considered to be an actor or core switch, while a switch 110 may be considered to be a peer or partner switch to switch 100. In this example, switches 100 and 110 have links established therebetween, e.g., links 101 and 103. Link 101 is "defined" or connects port 100-1 of switch 100 and port 110-1 of switch 110, while link 103 is defined between ports 100-2 of switch 100 and 110-2 of switch 110. As used herein, the term "link" can refer to a communication channel that connects two or more devices to effectuate the transmission/receipt/exchange of data between the two or more devices. Typically, a link is defined (or is comprised) of a port at either end of the link. It should be noted that examples of the present disclosure can be utilized with/for physical as well as virtual links, depending on the topology of the network or system. It should be understood that the terms "actor" or "core" and "peer" or "partner" are used herein to distinguish between devices or switches interacting with one another in the LAG context. For example, a switch at issue or a switch who's operational perspective is being considered, e.g., switch 100 may be referred to as an actor (core) switch, while switch 110 is switch 100's partner or peer switch.

When LAG is used/enabled between switches 100 and 110, as illustrated in FIG. 1B, it can be appreciated that links 101 and 103 are grouped together in/as LAG 102. As noted above, switches 100 and 110 (which can be Layer 2 (L2) devices) may run local instances of LACP, an L2 protocol. LACP is typically used for the purpose of exchanging control packets (L2 packets) between ports of each link in the context of negotiating LAG instances, in this example, LAG 102, which includes link 101 (including ports 100-1 and 110-1) and link 103 (which includes ports 100-2 and 110-2). The use/enablement of LAG in this example scenario is to, e.g., increase bandwidth by bundling two links together.

In particular, and referring now to FIG. 1B, switch 100 (actor) may be running an LACP instance, which in operation, advertises its LAG configuration information to switch 110 (partner). Switch 110, which may also be running an LACP instance will send its LAG configuration information to switch 100. LAG configuration information can include port number/ID, configured aggregation ID, and actor/partner system information. It should be noted that actor/partner designations and information will differ depending on the perspective, e.g., in this example, from its own perspective, switch 110 is the actor switch, while switch 100 is the partner switch, and the LAG configuration information is commensurate with this perspective. That is, switch 100 may advertise its LAG configuration information, e.g., ports 100-1 and 100-2, configured aggregation ID, e.g., LAG 10, along with relevant actor/partner system information, e.g., switch 100 belongs to SYS-A. Similarly, switch 110 advertises its LAG configuration information, e.g., ports 110-1 and 110-2, configured aggregation ID, e.g., 20, along with relevant actor/partner system information, e.g., switch 110 belongs to SYS-B.

As long as the LAG configuration information for a switch's partner ports matches, i.e., they are part of the same switch system (ports 110-1 and 110-2 belong to SYS-B, and the partner aggregation information is the same (both ports 100-1 and 100-2 connect to ports 110-1 and 110-2, respectively, where the partner aggregated ID indicates that ports 110-1 and 110-2 are associated with LAG 20 (the partner aggregation ID is 20), and respectively connect to ports 100-1 and 100-2, links 101 and 103 can be grouped or bundled together. In other words, if the ports/links of an actor switch go to the same switch, the links can be bundled. If not, links will not be aggregated.

Figure 2:
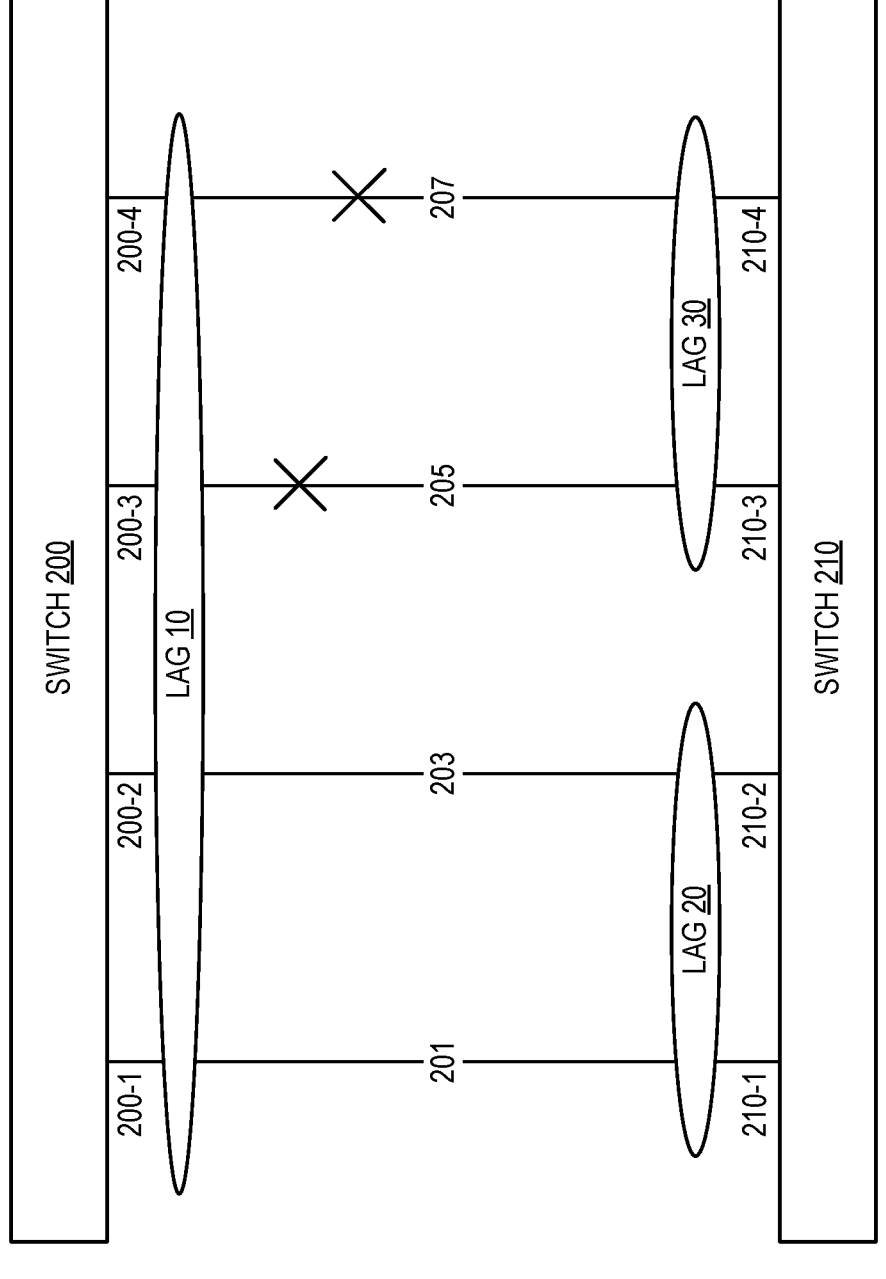
FIG. 2 illustrates an example LAG configuration mismatch scenario in a two-switch subsystem.

In some scenarios, a mismatch regarding LAG configuration, specifically in partner LAG configuration information, can occur. As an example, consider the scenario illustrated in FIG. 2, where two switches, switch 200 and switch 210 are partner/peer switches to one another. From switch 200's perspective, its LAG configuration reflects that all its links (201, 203, 205, 207) corresponding to ports 200-1, 200-2, 200-3, and 200-4, are aggregated, the LAG ID being 10. However, from switch 210's perspective, its LAG configuration information reflects a configuration including two different LAGs, LAG 20 (including links 201 and 203 corresponding to ports 210-1 and 210-2) and LAG 30 (including links 205 and 207 corresponding to ports 210-3 and 210-4), leading to the aforementioned mismatch. In such a scenario, links 205 and 207 may not be aggregated. That is, the LACP instances running in both switches 200 and 210 can compare received, partner switch LAG configuration information, in particular partner aggregation ID and partner system ID. In this example, the LACP instance running on switch 200 may choose not to bundle or group links 205 and 207 together with links 201 and 203 because not all switch 200's ports that correspond to links 201, 203, 205 and 207 will be grouped together from switch 210's perspective.

It should be noted that LACP instances typically exchange LAG confirmation information to negotiate/determine/monitor LAGs every, e.g., second, using keep-alive/acknowledge messages. That is, every second, partner switches can exchange keep alive messages that include the LAG configuration information. If a switch port does go down and does not respond with an acknowledgement within a given response window, e.g., within one second, or for some reason a switch changes its configuration, the LACP instance of a partner switch can take some appropriate action.

In smaller systems/networks, such as the examples discussed thus far, an LACP instance is more than capable of generating/maintaining a data store/cache of partner switch LAG configuration information, as well as negotiating LAGs, monitoring LAGs, etc. However, in high performance computing environments, where a network or switch fabric can include on the order of thousands of switches, LACP instances cannot operate as expected because of the exponential increase in number of switches which in turn results in more LAG configuration information needing to be exchanged/monitored between more switches. It should be understood that issues with LACP are not limited to switch fabrics with thousands of switches/devices. Rather, examples of the disclosed technology can be applied to any networks or fabrics with numbers of switches/devices or with switches/devices having operational/configuration characteristics regarding its ports, traffic, etc. that would overwhelm conventional LACP operation.

Figure 3:
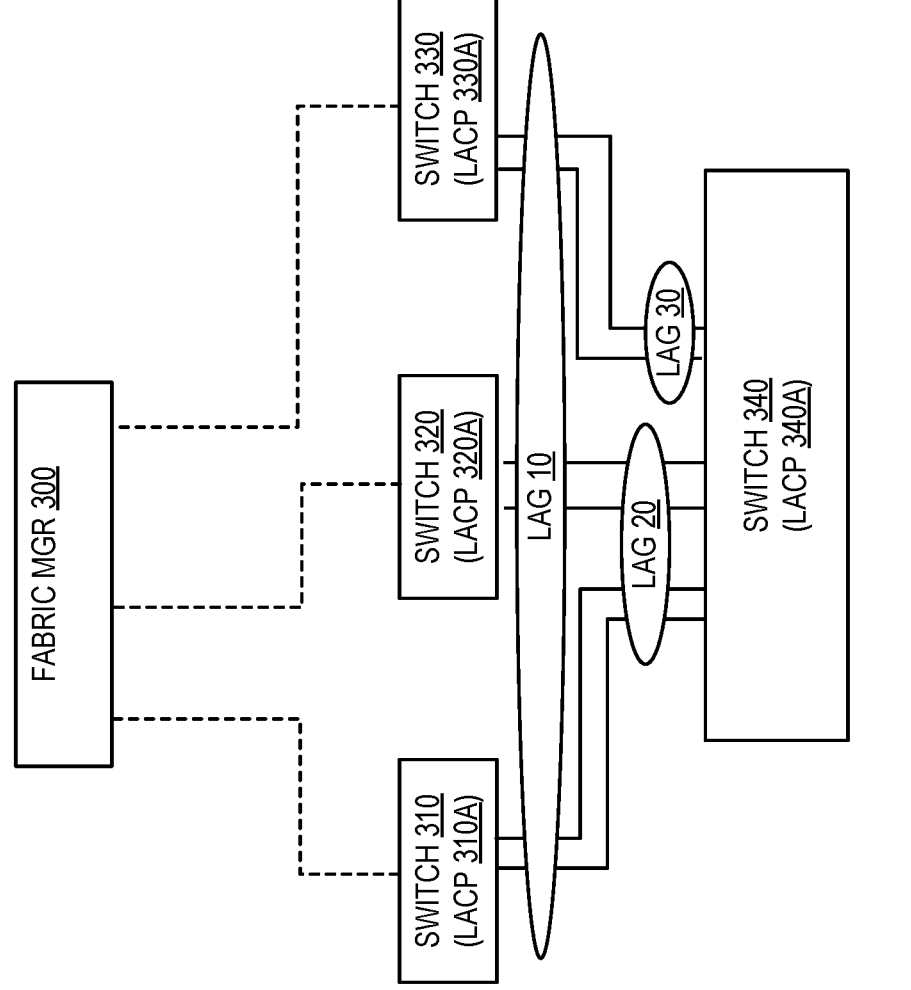
FIG. 3 illustrates an example LAG configuration scenario in a high performance computing switch fabric comprising multiple switches.

Referring now to FIG. 3, a portion of a high performance computing switch fabric is illustrated. A fabric manager 300 which can be/be implemented in a control plane device (e.g., an L3 device of an L3 network), is operatively connected to switches 310, 320, and 330. The role of fabric manager 300 is to configure switches (or any other L2 devices) under its purview, in this example, switches 310, 320, and 330, and apply port policies to the ports of switches 310, 320, and 330. In this example, switches 310, 320, and 330 are all part of the same system, e.g., each of their respective configurations will reflect that they belong to the same switch system.

As noted above, even the use of a fabric manager, such as fabric manager 300 may not address LAG configuration issues through the use of LACP. If indeed, fabric manager 300 were to control LAG configuration, the advertising of LAG configuration information regarding, e.g., switch 310, would have to traverse a path from fabric manager 300, to switch 310, and further on to switch 340, resulting in unwanted/undesirable latency. Likewise, any acknowledgement or return transmission of LAG configuration information from switch 340, would have to traverse a path from switch 340 to switch 310, and on to fabric manager 300.

Instead, it would be preferable to have LACP instances running on each of switches 310, 320, and 330 (as illustrated) to handle LAG configuration/monitoring in conjunction with fabric manager 300. However, as noted above, the manner in which LACP conventionally operates does not include sharing LAG configuration information with other switches in a network/fabric. A switch only typically exchanges LAG configuration information with a "direct" partner switch. That is, LACP instance 310A of switch 310 only has/maintains its own, local port information, and exchanges LAG configuration information with LACP instance 340A of switch 340. Similarly, LACP instance 320A of switch 320 only has/maintains its own, local port information, and exchanges LAG configuration information with LACP instance 340A of switch 340. As would be expected, LACP instance 330A only has/maintains its own, local port information, and exchanges LAG configuration information with LACP instance 340A of switch 340.

In order to establish/create fabric-wide knowledge of LAG configuration information amongst the switches of the fabric, each LACP instance of each switch in the fabric should be aware of each other switch's LAG configuration information. Accordingly, each LACP instance, e.g., LACP instances 310A, 320A, 330A, and 340A could transmit or advertise their respective LAG configuration information to fabric manager 300. LACP instance 300A of fabric manager 300 would then subsequently distribute or broadcast the received LAG configuration information to switches 310, 320, 330, and 340. However, LAG configuration mismatches can again occur.

Consider, for example, a scenario, where as illustrated in FIG. 3, each of switch 310, 320, and 330's ports (comprising these switches' links) are all aggregated under a single LAG, in this example, LAG 10. This LAG configuration can be gleaned from fabric manager 300 (in particular LACP 300A of fabric manager 300). From switch 340's perspective, however, the ports/links associated with switches 310 and 320 belong to a LAG 20, while the ports/links associated with switch 330 belongs to a LAG 30. It should be understood that in this example scenario, the LAG configuration mismatch is that from switch 310, 320, and 330's perspective, all their respective ports/links are aggregated into a single LAG, i.e., LAG 10, while from switch 340's perspective, the ports/links associated with switches 310, 320, and 330 belong to two different LAGS, i.e., LAG 20 and LAG 30.

That is, when LACP instance 340A of switch 340 transmits or advertises its LAG configuration information to, in part, LACP instance 310A of switch 310, and to LACP instance 320A of switch 320, it can be appreciated that the partner/peer LAG configuration information will match. In other words, from the perspective of LACP instances 310A and 320A of switches 310 and 320, respectively, all their ports/links are associated with a single LAG, i.e., LAG 10, while from the perspective of LACP 340A of switch 340, again, all the ports/links are associated with a single LAG, i.e., LAG 20 (LAG 10 is a partner/peer LAG ID to LAG 20, and vice-versa). Accordingly, these ports/links can be aggregated.

However, when LACP instance 340A of switch 340 transmits or advertises its LAG configuration information to, in part, LACP instance 330A of switch 330, where switch 340's ports/links are aggregated as LAG 30 (as the partner/peer aggregation ID), LACP instance 330A of switch 330 will proceed to bundle its ports/links under LAG 30. LACP instance 330A/switch 330 does not know/is not aware that its ports/links are actually bundled (or are supposed to be bundled) together along with those of switches 310 and 320, under the partner/peer LAG 20. Accordingly, LACP 330 may proceed to bundle it's ports/links with LAG 30 as its partner/peer aggregation ID. It should be noted that, as discussed above, while exchanging information between all switches in a fabric (or simply with switches other than "direct" partner/peer switches) vis-à-vis local LACP instances, and vis-à-vis a fabric manager, would theoretically be possible, because LACP is time-sensitive, exchanging per-port LACP information (LAG configuration information) with all other ports that are available in a fabric, in real-time is not feasible. Because fabric-wide LAG configuration awareness is not possible, such a mismatch will not be identified.

Referring to FIG. 4A, sample instructions in the form of code (that can be converted into a REST application programming interface (API)) are presented for pushing LAG configuration information from, e.g., a fabric manager, such as fabric manager 300 (FIG. 3) to switches of a switch fabric. As shown in FIG. 4A, the code can identify a LAG, in this example, LAG 10, to which the ports/links identified therein belong/are configured. In this example, six switches are identified, where those six switches have ports (making up one end of links) that are configured as a LAG. The six switches are identified as "x30000c0s1," "x30000c0s2," "x30000c1s1," "x30000c1s2," "x30000c2s1," and "x30000c2s2." The manner in which LAGs are encoded/defined may vary, e.g., the manner in which the switches are named/identified may differ, and can be subject to the particulars of the network/fabric or switches themselves.

In conjunction with identifying the switches whose port(s)/link(s) may be aggregated, the code further sets forth which ports of the identified switches belong to/fall under LAG 10 in accordance with this LAG configuration. In the example of FIG. 4A, the identified ports are as follows: port 0 of switch x30000c0s1; port 0 of switch x30000c0s2; port 0 of switch x30000c1s1; port 0 of switch x30000c1s2; port 0 of switch x30000c2s1; port 0 of switch x30000c2s2. In other words, according to the illustrated LAG-configuration instructions/code, port 0 of each switch is aggregated together under LAG 10.

It should be noted that the LAG mode, in this case, "DYNAMIC," which can refer to maintaining aggregation states of ports/links that belong to a LAG. As discussed, in some scenarios, LACP instances can exchange LAG configuration information between partner/peer devices, such as switches. In this way, link failures can be (theoretically) identified. In contrast, static LAG is a mode of operation where aggregation states are not maintained, and no signaling between peers/partners occurs. Thus, if a LAG configuration mismatch occurs, for example, link failures may not be detected. The "ACTIVE" LAG mode designation refers to the manner in which LACP is implemented, i.e., either actively, where LACP data units/packets may be sent in accordance with some defined periodicity along configured links, whereas a passive LAG mode operates such that LACP data units/packets are only sent in response to receiving LACP data units/packets from another LACP instance.

In accordance with examples of the present disclosure, FIG. 4B illustrates changes to the conventional manner in which LAG configuration information is sent/exchanged. As noted above, the instructions set forth in FIG. 4A represent LAG configuration information identifying a LAG and the ports/links that belong to that LAG, and nothing more, aside from operational mode information. However, as illustrated in FIG. 4B, in addition to identifying a LAG, as well as the ports/links belonging to that LAG, the instructions further identify or set forth configured peer/partner LAG configuration information. That is, a partner aggregation key (identifying a LAG, i.e., 20) is set forth. Thus, a receiving switch/LACP instance will be made aware of what partner/peer LAG the identified ports/links are associated. That is, the ports/links of the above-mentioned switches that are configured to be a part of LAG 10 will connect to those ports/links of LAG 20.

Additionally, switch information, such as system information may also be set forth/presented in an updated/reviewed LAG configuration in accordance with examples of the present disclosure. As previously discussed, in some scenarios, links may be aggregated between switches only when those switches belong to the same system. Accordingly, a peer/partner system ID or address (e.g., 00:06:00:00:00:01) can be specified in the LAG configuration as reflected in FIG. 4B.

FIG. 5A illustrates example operations that may be performed by, e.g., a fabric manager or other similar processing/controlling entity of a network for detecting LAG mismatches. Again, in systems/networks where link aggregation is used/implemented conventionally, devices do not typically receive LAG configuration information regarding each (or a subset) of the device's peer devices. As also discussed, when peer LAG configuration information is not shared amongst peer devices, mismatches can occur, where a first device's LAG configuration may not match/be correct.

Accordingly, at operation 500, in accordance with one example, a LAG configuration is specified for a plurality of devices of a network. In some contemplated scenarios, all/every device or switch of a network or belonging to a fabric may be considered, while in other scenarios, some subset or other set of peer devices may be considered. In some examples, such devices may be switches in a switch fabric.

At operation 502, partner (or peer) LAG configuration information may be appended to the LAG configuration (specified in operation 500). The partner LAG configuration information corresponds to the partner (or peer) devices of each/some subset of the plurality of switches of the fabric. That is, and in addition to the typical LAG configuration information that might be broadcast regarding a configured LAG (and the switches/ports belonging to that configured LAG), partner LAG configuration information may also be broadcast with the configured LAG (e.g., partner aggregation ID/LAG ID).

At operation 504, the LAG configuration and the partner LAG configuration information may be transmitted to the plurality of devices, the LAG configuration and the partner LAG configuration information prompting a mismatch check between the plurality of devices, and the partner devices. If a mismatch is detected pursuant to the mismatch check, affected links/LAGs may be put into an out-of-sync state (or otherwise disabled) so that those mismatched links/LAGs don't create unwanted loops in the fabric, nor generate increased traffic across links/LAGs by utilizing links/LAGs that shouldn't be utilized.

FIG. 5B illustrates example operations that may be performed by, e.g., a network device, such as a switch, for detecting LAG mismatches.

At operation 510, each device of the plurality of devices of a fabric receives LAG configuration information and partner LAG configuration information regarding the plurality of devices. Examples of the disclosure improve upon conventional systems/networks that allow for link aggregation by sharing peer/partner device information so that a device compare the device's current LAG configuration information with the partner LAG configuration information of the device's partner device.

That is, at operation 512, at each device of the plurality of devices, the device's current LAG configuration information can be compared with the partner LAG configuration information of the device's partner device. In other words, a first device or actor device may have a current LAG configuration that specifies a particular partner aggregation ID (partner LAG) to its ports/links. In response to receiving partner LAG configuration information from the fabric manager (See, e.g., FIG. 5A), that first/actor device can now compare its current partner LAG configuration to the device LAG configuration information received from the fabric manager. If the partner LAG configuration information does not match the first/actor switch's current partner LAG configuration, a misconfiguration or mismatch exists, and appropriate action may be taken.

Accordingly, at operation 514, a check is performed to determine whether a LAG configuration mismatch exists between the device and the partner device based on the above-described comparison. If a link/LAG mismatch exists, a device, such as a switch may allow traffic to traverse a link/LAG, not being informed that a link, for example, is not actually part of a LAG/the LAG to which the device "thinks" the device belongs.

If a determination is made that no LAG mismatch exists after comparing the resident LAG configuration information with that of the partner LAG configuration information, at operation 516, the "in-sync" status of a link is maintained. That is, in the case of a switch in a switch fabric, that link and associated LAG to which the link may belong, the link/LAG may remain operational and accessible by devices of the fabric or network.

However, if a LAG mismatch is found to exist, at operation 518, in response to a determination that a LAG configuration mismatch exists between the device and the corresponding partner device, an out of sync status is imparted onto one or more links between the device and the partner device corresponding to the LAG configuration mismatch. Accordingly, at operation 520, data transmission on the one or more links with the out of sync status is prevented. That is, any ports/links that are involved in a LAG configuration mismatch can be disabled or otherwise removed from use in the fabric.

FIG. 6A illustrates an example computing component 600 that may be used to implement a mechanism for determining LAG mismatches or misconfigurations between partner switches or devices. Referring now to FIG. 6B, computing component 600 may be, for example, a server computer, a controller, or any other similar computing component capable of processing data. In the example implementation of FIG. 6B, the computing component 600 includes a hardware processor 602, and machine-readable storage media 604.

Hardware processor 602 may be one or more central processing units (CPUs), semiconductor-based micropro-cessors, and/or other hardware devices suitable for retrieval and execution of instructions stored in machine-readable storage medium 604. Hardware processor 602 may fetch, decode, and execute instructions, such as instructions 606-612, identify LAG configuration mismatches or LAG mis-configurations. As an alternative or in addition to retrieving and executing instructions, hardware processor 602 may include one or more electronic circuits that include elec-tronic components for performing the functionality of one or more instructions, such as a field programmable gate array (FPGA), application specific integrated circuit (ASIC), or other electronic circuits.

A machine-readable storage medium, such as machine-readable storage medium 604, may be any electronic, mag-netic, optical, or other physical storage device that contains or stores executable instructions. Thus, machine-readable storage medium 604 may be, for example, Random Access Memory (RAM), non-volatile RAM (NVRAM), an Electri-cally Erasable Programmable Read-Only Memory (EE-PROM), a storage device, an optical disc, and the like. In some examples, machine-readable storage medium 604 may be a non-transitory storage medium, where the term "non-transitory" does not encompass transitory propagating sig-nals. As described in detail below, machine-readable storage medium 604 may be encoded with executable instructions, for example, instructions 606-612.

In accordance with one example, hardware processor 602 may execute instruction 606 to specify a LAG configuration for a plurality of switches of a fabric. Accordingly, hardware processor 602, which may be an embodiment of a fabric manager, such as fabric manager 300 (FIG. 3), obtains or is instructed to broadcast a LAG configuration defining which port(s) (making up links) of which switch(es) belong to a particular LAG.

As discussed above, in the context of enterprise systems or switch fabrics having numbers of devices that exceed the practical operational capability of conventional LACP, devices, LAG misconfigurations or LAG configuration mis-matches can go undetected. This is because according to conventional LACP, only partner or peer devices exchange LAG configuration information with one another, and the latency involved with the use of a system or switch-wide fabric manager is untenable. For example, synchronizing LAG configuration information between multiple switches, e.g., thousands of switches, in real time is not possible under conventional operating constraints of LACP.

Accordingly, hardware processor 602 may execute instruction 608 to append partner LAG configuration infor-mation to the determined LAG configuration, the partner LAG configuration information corresponding to partner switches of the plurality of switches of the fabric. That is, and in addition to the typical LAG configuration information that might be broadcast regarding a configured LAG (and the switches/ports belonging to that configured LAG), part-ner LAG configuration information may also be broadcast with the configured LAG. The partner LAG configuration information may include information such as a partner aggregation ID/LAG ID. For example, and referring back to FIG. 4B, the partner LAG ID of 20 (LAG 20) corresponding to LAG 10 means that the ports aggregated together under LAG 10 correspond to the ports aggregated together under LAG 20. Additional partner LAG configuration information may be appended to the LAG configuration. For example, the system ID identifying a system to which a partner switch(es) belong may be appended to the LAG configura-tion. As discussed above, in certain scenarios, for a LAG to be valid, the switches encompassed by the LAG (more particularly, the ports of the switches defining the links between the switches) should belong to/fall under the same system ID.

Hardware processor 602 may execute instruction 610 to transmit the LAG configuration and the partner LAG con-figuration information to each of the plurality of switches. It should be noted that the LAG configuration and the partner LAG configuration information prompts a mismatch check between the plurality of switches and the partner switches. Again, the inclusion of partner LAG configuration informa-tion in LACP messaging that is transmitted or otherwise broadcast to the switches of a fabric or system allows each LACP instance in each relevant switch to compare its partner LAG configuration information, i.e., the partner LAG configuration information specified in its resident configuration, with the partner LAG configuration informa-tion received from the fabric manager. In this way, a local LACP instance can determine whether or not a LAG mis-configuration or LAG configuration mismatch exists between a current LAG configuration and a received LAG configuration.

Hardware processor 602 may execute instruction 612 to, in the event that a mismatch is identified, disable the link subject to/associated with the mismatch. In some examples, disabling the link may comprise blocking the link (or blocking access to the link) by sending an out-of-sync message or notification, e.g., setting an out-of-sync flag in a message, to the partner system, (identified by the partner system ID) over the mismatched link.

In accordance with another example, FIG. 6B illustrates an example computing component 620 that may be used to implement a mechanism for determining LAG mismatches or misconfigurations between partner switches or devices. In some examples, computing component 620 may be an embodiment of or embodied in/as a switch or other network device (and similar to the componentry illustrated in FIG. 6B and described above, computing component 620 may be a computing component capable of processing data. In the example implementation of FIG. 6B, the computing com-ponent 620 includes a hardware processor 622, and machine-readable storage media 624.

Hardware processor 622 may execute instruction 626 to, at switches of a plurality of switches of a switch fabric, receive LAG configuration information and partner LAG configuration information regarding the switches. As noted above, computing component 620 may be a switch or may be a processing component of a switch running an LACP instance. As also noted above, with regard to FIG. 6B, a fabric manager may specify and broadcast LAG configura-tion information across a fabric, e.g., to switches of a switch fabric. Because conventional LACP effectuates the exchange of LAG configuration information only between peer or partner switches, a fabric manager can be used to distribute, e.g., fabric-wide LAG configuration information. In addition, deviating from conventional LACP operation, the fabric manager may also append partner LAG configu-ration information to the LAG configuration information of the switches. In this way, switches can receive LAG con-figuration information relevant to the switches themselves, e.g., what/which ports of a link between partner switches, are grouped together in a LAG, as well as proposed partner LAG configuration information, e.g., partner system ID and partner aggregation ID (LAG ID) information. In this way, a switch (or LACP instance of a switch) is able to compare its resident partner LAG configuration with a proposed partner LAG configuration.

To the above, hardware processor 622 may execute instruction 628 to, at the switches of the plurality of switches, compare a switch's current LAG configuration information with the partner LAG configuration information of the switch's partner switch. That is, a first switch or actor switch may have a current LAG configuration that specifies a particular partner aggregation ID (partner LAG) to its ports/links. In response to receipt of the partner LAG configuration information from the fabric manager, that first/actor switch can now compare its current partner LAG configuration to the partner LAG configuration information received from the fabric manager. If the partner LAG configuration information does not match the first/actor switch's current partner LAG configuration, a misconfiguration or mismatch exists, and appropriate action may be taken. For example, and referring back to FIG. 4B, port 0 of jack 1 of switch x3000c0r1 may be configured to belong to (may be mapped to) a LAG, e.g., LAG 10, per a received LAG configuration with partner LAG configuration information from a fabric manager. Currently, the LAG configuration under which port 0 of jack 1 of switch x3000c0r1 indicates that the ports/links of LAG 10 correspond to the ports/links of LAG 30, whereas the received partner LAG configuration information indicates that the ports/links of LAG 10 are supposed to correspond to the ports/links of LAG 20. This is a LAG configuration mismatch or LAG misconfiguration.

Accordingly, hardware processor 622 may execute instruction 630 to, in response to a determination that a LAG configuration mismatch exists between the switch and the corresponding partner switch, impart an out of sync status onto one or more links between the switch and the partner switch corresponding to the LAG configuration mismatch. Otherwise, per conventional LACP operation, unidentified LAG configuration mismatches can result in ports/links exchanging "SYNC" messages despite such mismatches, which in turn can result in throughput drops, the creation of unwanted link loops in a fabric or network, etc. Subsequently, still, hardware processor 622 may execute instruction 622 to prevent data transmission on the one or more links with the out of sync status. That is, any ports/links that are involved in a LAG configuration mismatch can be disabled or otherwise removed from use in the fabric.

Figure 7:
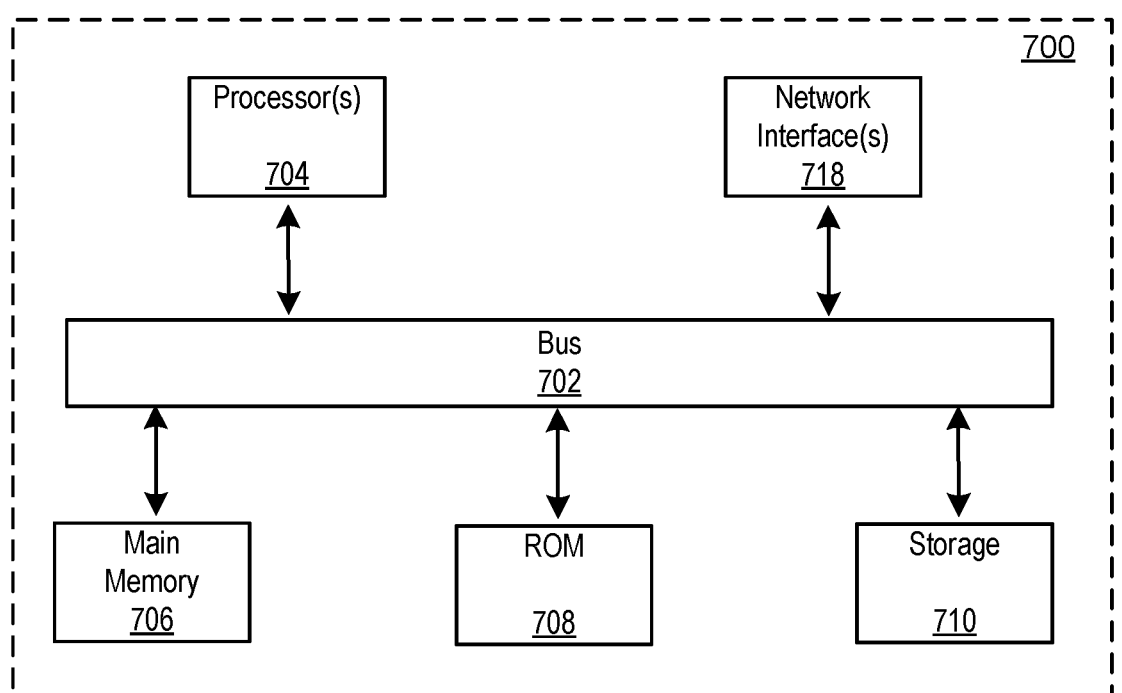
FIG. 7 is an example computing component that may be used to implement various features of examples of the present disclosure.

FIG. 7 depicts a block diagram of an example computer system 700 in which various of the examples described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors. Computer system 700 may be embodied as, e.g., one or more of switches 100/110 (FIGS. 1A and 1B), 200/210 (FIG. 2), as well as one or more components/elements of FIG. 3.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system

700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer system 700 also includes interface 718 coupled to bus 702. Interface 718 provides a two-way data communication coupling to one or more network links that are connected to one or more local networks. For example, interface 718 may be an integrated services digital network (ISDN) card, cable modem, satellite modem, or a modem to provide a data communication connection to a corresponding type of telephone line. As another example, interface 718 may be a local area network (LAN) card to provide a data communication connection to a compatible LAN (or WAN component to communicated with a WAN). Wireless links may also be implemented. In any such implementation, interface 718 sends and receives electrical, electromagnetic or optical signals that carry digital data streams representing various types of information. For example, as illustrated in FIGS. 1A/1B, switches 100/110 (which may be embodiments of computer system 700) may communicate with one another over a switch fabric via network interface(s) 718.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through interface 718, which carry the digital data to and from computer system 700, are example forms of transmission media.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed examples. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:
specifying a link aggregation group (LAG) configuration for a plurality of switches of a fabric;
appending partner LAG configuration information to the LAG configuration, the partner LAG configuration information corresponding to partner switches of the plurality of switches of the fabric; and
transmitting the LAG configuration and the partner LAG configuration information to the plurality of switches, the LAG configuration and the partner LAG configuration information prompting a mismatch check between the plurality of switches and the partner switches.

2. The method of claim 1, wherein the LAG configuration associates one or more ports of one or more switches of the plurality of switches with a LAG.

3. The method of claim 2, wherein the partner LAG configuration information comprises information specifying a partner LAG to the LAG.

4. The method of claim 3, wherein the partner LAG configuration information further comprises information specifying a switch system to which the one or more switches belongs.

5. The method of claim 1, wherein the specifying, the appending, and the transmitting is performed by a fabric manager.

6. The method of claim 5, wherein the fabric manager maintains a fabric-wide data store of LAG configurations.

7. The method of claim 1, wherein the prompted mismatch check comprises comparing a current LAG configuration of each of the plurality of switches with the partner LAG configuration information to determine whether the current LAG configuration specifies the same partner LAG as that specified by the partner LAG configuration information.

8. The method of claim 1, further comprising disabling a link between at least one of the plurality of switches and a corresponding one of the partner switches in response to determining existence of a mismatch between the transmitted LAG configuration and partner LAG configuration information and resident LAG configuration and partner configuration information of the at least one of the plurality of switches.

9. The method of claim 8, wherein disabling the link comprises blocking access to the link.

10. The method of claim 9, wherein blocking access to the link comprises transmitting an out-of-sync notification to a partner system identified by the partner LAG configuration information.

11. A method, comprising:
at switches of a switch fabric, receive link aggregation group (LAG) configuration information and partner LAG configuration information regarding the switches;
at the switches, compare a switch's current LAG configuration information with the partner LAG configuration information of the switch's partner switch;
in response to a determination that a LAG configuration mismatch exists between the switch and the partner switch, impart an out-of-sync status to one or more links between the switch and the partner switch corresponding to the LAG configuration mismatch; and
prevent data transmission on the one or more links with the out-of-sync status.

12. The method of claim 11, wherein the LAG configuration associates one or more ports of one or more switches of the plurality of switches with a LAG.

13. The method of claim 12, wherein the partner LAG configuration information comprises information specifying a partner LAG to the LAG.

14. The method of claim 13, wherein the partner LAG configuration information further comprises information specifying a switch system to which the one or more switches belongs.

15. The method of claim 11, wherein the LAG configuration and the partner LAG configuration information is received from a fabric manager.

16. The method of claim 15, wherein the fabric manager maintains a fabric-wide data store of LAG configurations.

17. A network device, comprising:

a processor; and a memory storing instructions that when executed, cause the processor to:

compare resident link aggregation group (LAG) configuration information of the network device with LAG configuration information and partner LAG configuration information regarding a plurality of peer network devices of a fabric, the fabric including the network device; and in response to a determination that a LAG configuration mismatch exists between the network device and one of the peer network devices of the fabric, disable access to one or more links between the network device and the one of the peer network devices corresponding to the LAG configuration mismatch.

18. The network device of claim 17, wherein the LAG configuration information and the partner LAG configuration information regarding the plurality of peer network devices of the fabric is received from a fabric manager of the fabric.

19. The network device of claim 17, wherein each of the network device and the peer network devices are executing therein, a Link Aggregation Control Protocol (LACP) instance.

20. The network device of claim 17, wherein disabling access to the one or more links comprises transmitting an out-of-sync notification to a partner system identified by the partner LAG configuration information over the one or more links.

* * * * *